United States Patent
Gorski et al.

(10) Patent No.: US 7,082,814 B2
(45) Date of Patent: Aug. 1, 2006

(54) METHOD AND APPARATUS FOR TESTING FLUID FLOW AND FLUSHING A TRANSMISSION COOLER

(75) Inventors: Tim Gorski, Owatonna, MN (US); Bill Brown, Bryan, OH (US); Walter Murray, Pioneer, OH (US); Larry Lageson, Owatonna, MN (US); Scott Opsahl, Lakeville, MN (US); Gary Murray, Montpelier, OH (US)

(73) Assignee: SPX Corporation, Charlotte, NC (US)

( * ) Notice: Subject to any disclaimer, the term of this patent is extended or adjusted under 35 U.S.C. 154(b) by 0 days.

(21) Appl. No.: 10/735,617

(22) Filed: Dec. 16, 2003

(65) Prior Publication Data

US 2005/0126271 A1    Jun. 16, 2005

(51) Int. Cl.
*G01M 15/00* (2006.01)
(52) U.S. Cl. ..................................... 73/118.1
(58) Field of Classification Search ................. 73/116, 73/117.2, 117.3, 118.1, 119 R
See application file for complete search history.

(56) References Cited

U.S. PATENT DOCUMENTS

| 5,472,064 A | * | 12/1995 | Viken | 184/1.5 |
| RE36,650 E | * | 4/2000 | Viken | 184/1.5 |
| 6,210,565 B1 | * | 4/2001 | Evans | 210/87 |
| 6,412,341 B1 | * | 7/2002 | Ballew | 73/118.1 |
| 6,684,714 B1 | * | 2/2004 | Mills et al. | 73/861 |
| 2003/0205432 A1 | * | 11/2003 | Mills et al. | 184/1.5 |
| 2003/0213309 A1 | * | 11/2003 | Mills et al. | 73/861 |
| 2003/0233874 A1 | * | 12/2003 | Mills et al. | 73/196 |

\* cited by examiner

*Primary Examiner*—Eric S. McCall
(74) *Attorney, Agent, or Firm*—Baker & Hostetler LLP

(57) ABSTRACT

A method and apparatus for testing fluid flow and flushing a transmission cooler. In a preferred embodiment of the invention, the apparatus is designed to test fluid flow through a transmission cooler and/or clean out debris within a transmission cooler by using heated transmission fluid and air-inject technology.

28 Claims, 3 Drawing Sheets

METHOD AND APPARATUS FOR TESTING FLUID FLOW AND FLUSHING A TRANSMISSION COOLER

FIELD OF THE INVENTION

The present invention relates generally to cleaning cooling systems. More particularly, the present invention relates to a method and apparatus for testing fluid flow and flushing transmission cooling systems.

BACKGROUND OF THE INVENTION

Automotive manufactures may desire ways to reduce warranty costs on high dollar items such as transmissions. Many consumer and industrial vehicles use automatic transmissions filled with automatic transmission fluid (ATF) as the working fluid. The working fluid may be useful, for instance, in aiding cooling of the transmission. In typical configurations, automatic transmissions are equipped with a cooling system, such as a transmission cooler. The automatic transmission fluid can be configured to flow through the transmission cooler, in an effort to reduce the temperature of the fluid, and then cycle it back into the transmission in order to keep the transmission cool.

The importance of maintaining fresh and clean transmission fluid can be essential in keeping the transmission cool. At regular intervals, the automatic transmission fluid should be removed from the transmission and replaced with fresh fluid as the fluid properties of the automatic transmission fluid may degrade in time and with use. For example, entrained contaminants and debris, not fully removed by the filter assembly of the transmission, can clog the transmission cooler—the result of which is that proper automatic transmission fluid flow through the transmission cooler and to the transmission is prevented. Improper automatic transmission fluid flow can cause the transmission to overheat and produce serious, if not, permanent damage.

In instances where a transmission is replaced, it may be important to test the automatic transmission fluid flow through a reused transmission cooler which is connected to a newly installed transmission. This is to ensure that no debris from the replaced transmission is transferred into the reconnected transmission cooler. Such debris can also prohibit fluid flow to the newly installed transmission once the entire system is reconnected. If fluid flow is prohibited by any debris within the transmission cooler, the efficiency of providing thermal dissipation to the circulating fluid may be greatly inhibited. Thus, a newly installed transmission will also not be properly cooled due to a combination of the lack of fluid it receives from the blocked transmission cooler or the improperly maintained temperature regulation of the fluid being received from the transmission cooler—the result of which can ruin a newly installed transmission due to overheating.

A need still exists, therefore, for an evaluation of fluid flow to the transmission cooling system which identifies whether the fluid is continuously flowing properly. A need further exists for a flushing step that agitates the fluid in order to break loose any debris within the transmission cooler and to effectively clean the cooling system. By removing the debris, the transmission will be less susceptible to failure due to debris blocking the transmission cooler or repeatedly flowing through the transmission.

SUMMARY OF THE INVENTION

The foregoing needs are met, to a great extent, by the present invention, wherein in one aspect an apparatus is provided that in some embodiments. By removing the debris, the transmission will be less susceptible to failure due to debris blocking the transmission cooler or repeatedly flowing through the transmission.

In accordance with one embodiment of the present invention, an apparatus for testing fluid flow and flushing a transmission cooler is provided that in some embodiments includes a user interface panel, a fluid supply line and a fluid return line, a pressure switch, a manual shut off valve, a filtering system, and a flow switch coupled to the return line. The apparatus further provides a reservoir tank and heating element located within the reservoir tank. A fluid fill port is connected to the reservoir tank. An air pump is also coupled to the reservoir tank. An air injection system is coupled to the air pump and the supply line, and a flow meter is coupled with the air pump.

In accordance with another aspect of the present invention, a method of testing fluid flow and/or flushing a transmission cooler is provided that in some embodiments includes providing a supply of automatic transmission fluid to cycle through a transmission cooler and heating the of the supply of automatic transmission fluid. The method further includes supplying the automatic transmission fluid is through a fluid supply line which is connected to an OUT line of a transmission cooler. The automatic transmission fluid is re-circulated from an IN line of the transmission cooler into a connected fluid return line. The re-circulated automatic transmission fluid is filtered and returned back into the supply of automatic transmission fluid.

In accordance with yet another embodiment aspect of the present invention, a system for testing fluid flow and/or flushing a transmission cooler is provided which in some embodiments includes a means for supplying automatic transmission fluid to cycle through a transmission cooler, a means for heating the supply means of automatic transmission fluid, a means for progressing the automatic transmission fluid through a fluid supply line connected to an OUT line of a transmission cooler, a means for re-circulating the automatic transmission fluid from an IN line of the transmission cooler into a connected fluid return line, a means for filtering the re-circulated automatic transmission fluid, and a means for returning the filtered automatic transmission fluid back into the supply of automatic transmission fluid.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Figure 1:
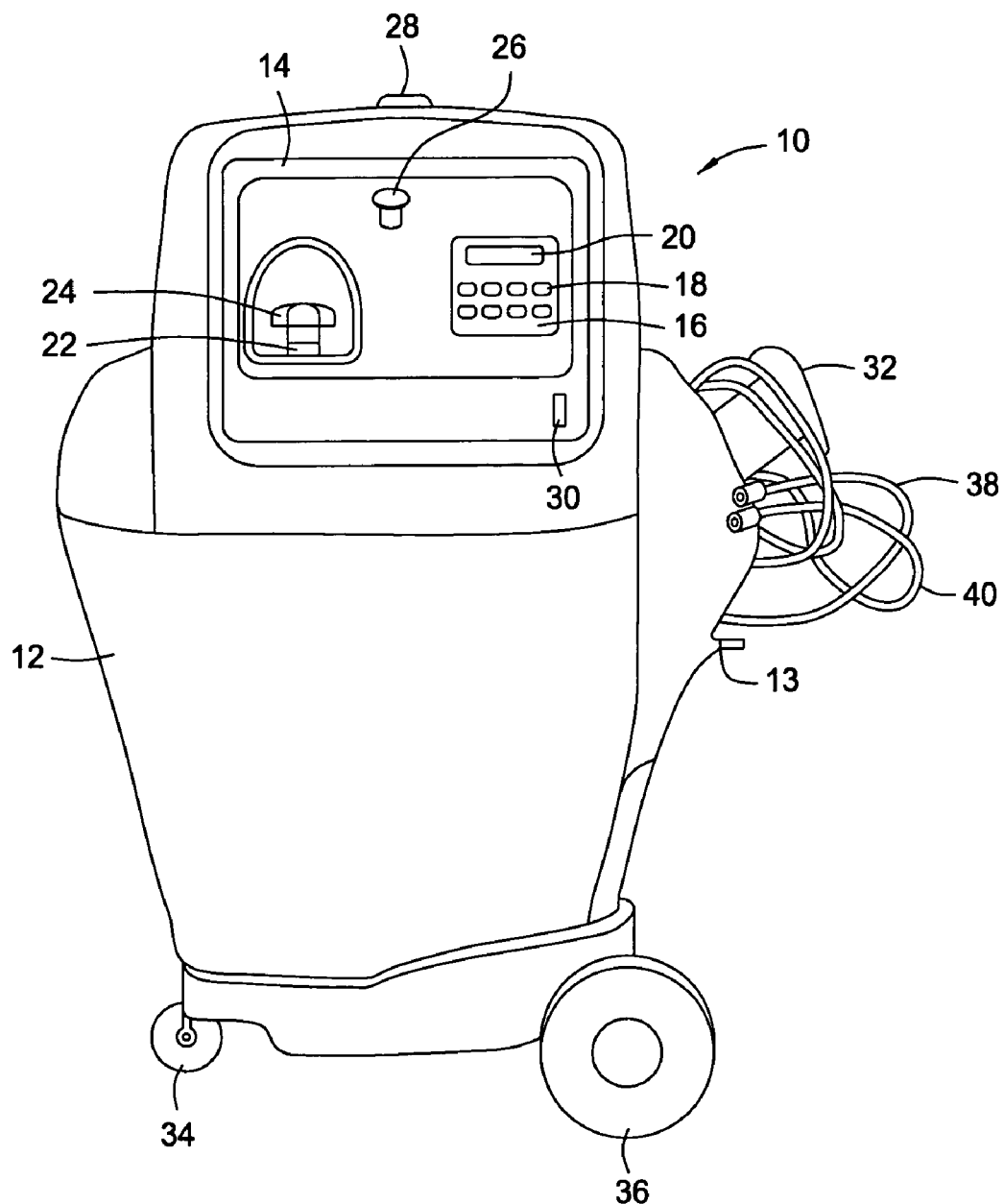
FIG. 1 is a perspective view illustrating a transmission cooler flushing machine according to a preferred embodiment of the invention.

An embodiment in accordance with the present invention provides a method and apparatus for testing fluid flow and flushing a transmission cooler. In a preferred embodiment of the invention, the apparatus is designed to test fluid flow through a transmission cooler and/or clean out debris within a transmission cooler by using heated transmission fluid and air-inject technology. The invention will now be described with reference to the drawing figures, in which like reference numerals refer to like parts throughout.

An embodiment of the present invention apparatus is illustrated in FIG. 1, which shows a transmission cooler flushing machine 10. The device is further capable of testing fluid flow to a cooling system and/or a transmission. The transmission cooler flushing machine 10 may be comprised of a stamp steel skeleton with a plastic exterior shell. In a preferred embodiment, removable door access panels 12 may be built into the plastic shell exterior. The access panels 12 serve to cover and protect inner components of the transmission cooler flushing machine 10 such as those described below. An external compressed air supply source is connected to an air intake fitting 13.

A user interface panel 14 is preferably mounted to a front side of the transmission cooler flushing machine 10. The user interface panel 14 integrates various components with the transmission cooler flushing machine 10 in order to allow an operator to set the device for performing a variety of functions. Such functions may be set via a keypad 16 located on the user interface panel 14. As will be further explained below, the keypad 16 preferably has functions for heating, testing fluid flow, flushing, purging, emptying a fluid reservoir tank, and a stop function. Additional keypads denoting an up arrow and a down arrow may also be utilized in order to enhance the functionality of the aforementioned function keys. For instance, the up and down arrows can provide incremental adjustments to a particular function. Each of the respective functions may be set/programmed via a keypad button 18 located on the keypad 16. An information display window 20 is preferably integrated within the keypad 16 in order to convey information to a user. The display window 20 may comprise one of a variety of available readout technologies including, for example, a liquid crystal display (LCD).

A fill-port 22 is provided through the user interface panel 14 and is connected to a reservoir tank located on an interior of the transmission cooler flushing machine 10. A fill cap 24 may effectively seal the fill-port 22, for instance, via a threadable connection.

The transmission cooler flushing machine 10 also contains an emergency stop button 26 which can be utilized in case of a machine malfunction or operator error. An indicator light 28 is preferably mounted on top of the transmission cooler flushing machine 10. The indicator light 28 will blink or stay lit during various operations of the transmission cooler flushing machine 10. The transmission cooler flushing machine 10 is powered on using the main power switch 30. Handle 32 and attached wheels 34, 36 provide maneuverability and portability to the transmission cooler flushing machine 10.

Figure 2:
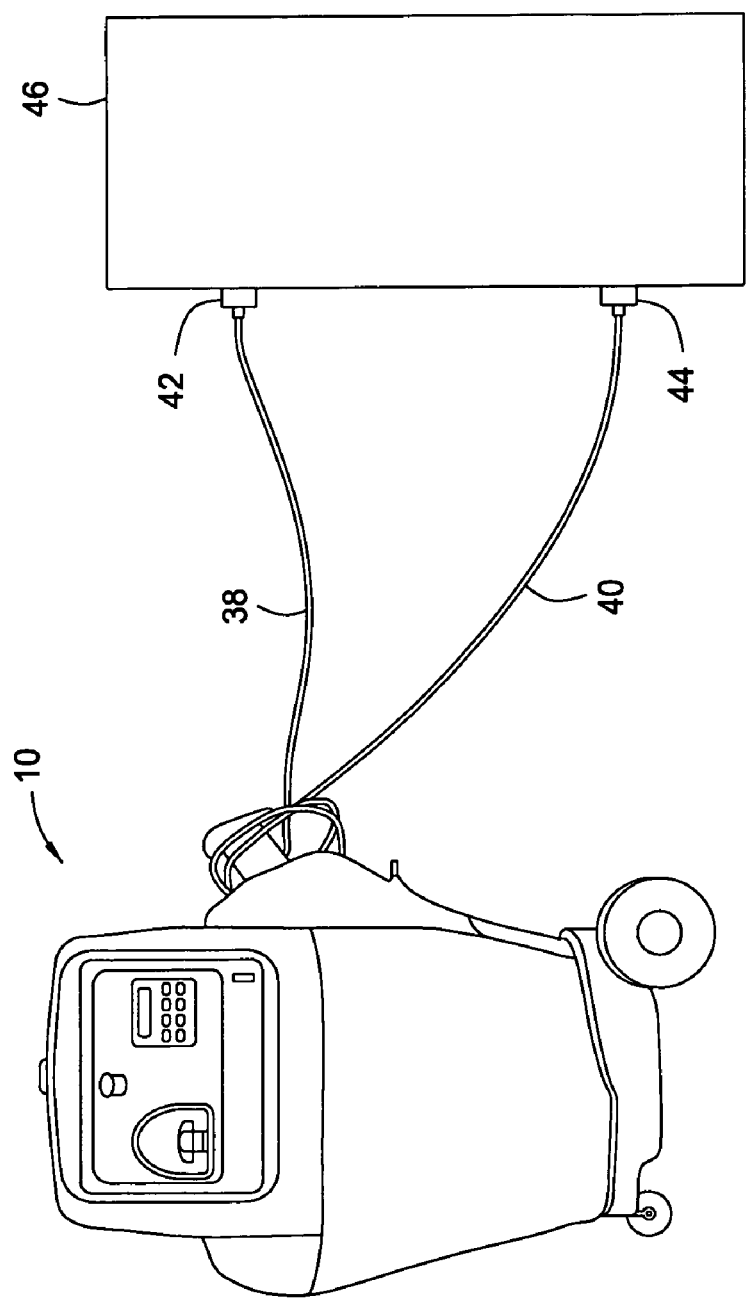
FIG. 2 is a diagram of the feed hoses from the transmission cooler flushing machine in connection with a transmission cooler.

External quick disconnect fluid hoses 38, 40 are provided in order to connect the transmission cooler flushing machine 10 to a transmission cooler. As depicted, for instance, in FIG. 2, the supply line 38, or "to cooler" line, is connected to the "OUT line" 42 of the transmission cooler 46. In like manner, the return line 40, or "from cooler" line, is connected to the "IN line" 44 of the transmission cooler 46.

Figure 3:
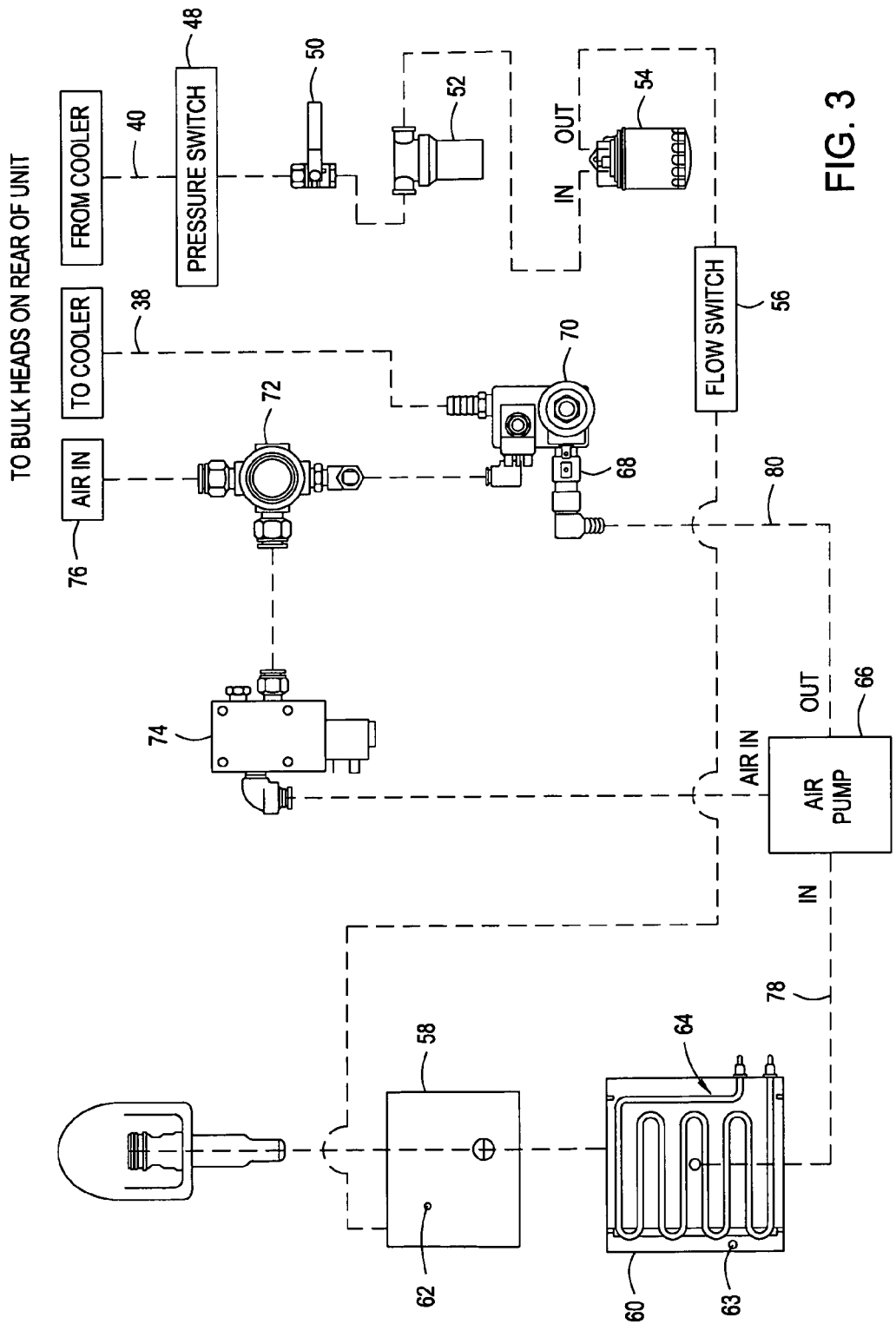
FIG. 3 is a plumbing diagram of the transmission cooler flushing machine.

An explanation of the plumbing diagram of the transmission cooler flushing machine 10 will now be described in a preferred embodiment of the invention. FIG. 3 depicts the plumbing diagram of the internal components of the transmission cooler flushing machine 10. Beginning with the return hose line 40, a number of components are coupled thereto including, for example, a pressure switch 48, a manual shut off valve 50, a filtering system 52, 54, and an inline flow switch 56.

The pressure switch 48 serves to detect the back pressure within the return hose line 40 prior to the filtering system 52, 54. In a preferred embodiment, the pressure within the return hose line 40 will achieve a prescribed benchmark pressure such as 60 psi. Monitoring the back pressure to see if the aforementioned prescribed benchmark is exceeded may help an operator determine whether there is a clog in the system such as downstream in the filtering system 52,54. If the back pressure, sensed by the pressure switch 48, becomes elevated above a prescribed level, the transmission cooler flushing machine 10 is designed to shut down automatically and to further alert the user that the filter needs to be checked.

The manual shut off valve 50 is coupled to the return line 40 in order to prevent fluid from flowing through the system at a point prior to the filtering system 52,54. The shut off valve 50 may be employed, for instance, to service the transmission cooler flushing machine 10 such as by replacing the filtering system 52,54. When the manual shut off valve 50 is in the closed position, the transmission cooler flushing machine 10 will shut down automatically.

Continuing along the return line 40, a filtering system 52,54 is attached thereto. In a preferred embodiment, the filtering system is composed of a primary filter assembly 52 and a secondary filter assembly 54. The primary filter assembly 52 is preferably designed to filter out large chunks of debris that may occur within the filtered fluid. Preferably, the primary filter 52 is comprised of a strainer basket having a stainless steel mesh insert. The basket may be clear in order to allow visual inspection of the primary filter assembly 52 to help determine whether it is dirty and/or clogged.

The secondary filter assembly 54 is preferably designed to filter out smaller and/or any remaining particulates within the filtered fluid. The secondary filter assembly 54 is generally located downstream from the primary filter assembly 52. In a preferred embodiment, the secondary filter comprises an automotive oil filter type.

The inline flow switch 56 detects fluid flow on the return line 40 from the transmission cooler 46 back into the transmission cooler flushing machine 10. If the fluid flow is detected by the flow switch 56 to be below a certain flow level, such as ¼ gallon per minute (GPM), the transmission cooler flushing machine 10 will shut down automatically. A low fluid flow level may indicate a clog in the transmission cooler 46 or a malfunction.

The return line 40 feeds into a reservoir tank 60 through a reservoir lid 58. The reservoir tank 60 holds the automatic transmission fluid which is cycled through the transmission cooler 46. A heating element 64 is also located within the reservoir tank 60 and is used to heat the automatic transmission fluid. In a preferred embodiment, it is mounted approximately ½" from the bottom of the reservoir tank 60. A temperature sensor port 62 is utilized to detect the temperature of the automatic transmission fluid within the reservoir tank 60 and is preferably mounted through the reservoir lid 58. A float type liquid level sensor 63 detects the fluid level amount of automatic transmission fluid within the reservoir tank 60. It may be mounted through the side of the reservoir tank 60.

An air operated fluid pump 66 is coupled to a first fluid transfer means 78 from the reservoir tank 60 and an air inject valve assembly 70 via a second fluid transfer means 80. A solenoid valve 74 is coupled to an air inlet of the air operated fluid pump 66 and an air regulator 72. In one embodiment a flow meter 68 may be utilized to measure a fluid flow rate of the automatic transmission fluid, for example, by connecting it at a location downstream from the second fluid transfer means 80. The supply line 38 is connected to an outlet of the air inject valve 70 and feeds automatic transmission fluid to the transmission cooler flushing machine 10. The air regulator 72 is also coupled to the air inject valve 70 and to an air supply unit 76.

Compressed air is supplied to the air operated fluid pump 66 via the air supply unit 76. The air regulator 72 serves to adjust the air pressure received from the air supply unit 76 to a regulated air pressure such as 100 psi. The solenoid valve 74 controls the supply of air supplied to the air operated fluid pump 66.

A primary purpose of the air operated fluid pump 66 is to cycle the automatic transmission fluid from the transmission cooler flushing machine 10 into a device such as the transmission cooler 46. The air operated fluid pump 66 may comprise a diaphragm-type pump powered by a compressed air source such as the air supply unit 76. An advantage of utilizing the air operated fluid pump 66 in the prescribed manner includes utilizing less power to operate the transmission cooler flushing machine 10. This, in part, is because more power can be regulated to other components of the transmission cooler flushing machine 10, such as to the heating element 64, for example. Thus, the drawn electrical power from a typical electrical circuit, for example 15 amps, may be reserved for other components such as for the heating element 64. The effect, of which, may result in quicker heating of the automatic transmission fluid and, hence, increased efficiency in using the transmission cooler flushing machine 10 to test fluid flow and/or perform flushing operations. The diaphragm-type pump configuration can also provide good pressure pulses throughout the transmission cooler 46 assembly. Additionally, the air operated fluid pump 66 may also be utilized to empty the reservoir tank 60 by pumping all the fluid out of the reservoir tank 60 into a waste receptacle via the supply line 38.

The flow meter 68 measures the overall flow rate to and from the transmission cooler 46 in a closed loop cycle. During a flushing operation, the air inject valve 70 is utilized to inject air pulsations into the automatic transmission fluid. The effect of introducing air pulses into the automatic transmission fluid creates turbulence to the fluid flow stream. The continuous bombardment of fluid turbulence against any debris that may be within the transmission cooler serves to break it loose from the inner surfaces of the transmission cooling system in a general and gradual fashion. Any eradicated debris may be carried away by the cycling fluid and filtered within the filter assembly 52, 54. The air inject valve 70 is also used to purge the supply line 38, the return line 40 and the transmission cooler 46 by injecting air only into the closed loop thus blowing all fluid back into the reservoir tank 60.

In a preferred operation, the transmission cooler flushing machine 10 is designed to test fluid flow and clean out debris which may exist within a transmission cooler 46 by using heated transmission fluid and air-inject technology. The transmission cooler flushing machine 10 is capable of heating automatic transmission fluid (ATF) in excess of a prescribed temperature, such as 190° F., and pumping several gallons of hot, pressurized automatic transmission fluid per minute. The pulsation action of the air-inject valve 70 helps to dislodge debris and remove it from the transmission cooler. By removing the debris, the transmission cooler will be less susceptible to failure due to inhibited fluid flow cause by debris or repeated debris flowing through the transmission.

To operate the transmission cooler flushing machine 10, a user may program the machine to perform one of a variety of functions using one of the keypad functions. By way of example, a list of keypad functions is presented as follows:

| KEYPAD | FUNCTION |
| --- | --- |
| HEAT: | Heats up ATF to 190° F. Light on top of unit will blink as the ATF is heating up, and will stay ON when ATF reaches operating temperature. |
| FLOW: | Tests the flow rate, in gallons per minute (GPM), of the transmission cooler and cooler lines. |
| FLUSH: | Allows pressurized ATF, with a high pressure pulse of air, to flush contaminated oil and debris from the transmission cooler. Use UP/DOWN arrow keys to adjust time of flush. NOTE: Air will not be injected until ATF is up to temperature. |
| UP ARROW: | Increases time of flush by one (1) minute increments. |
| DOWN ARROW: | Decreases time of flush by one (1) minute increments. |
| PURGE: | Uses air to purge ATF from transmission cooler and lines. |
| STOP: | Will stop the transmission cooler flushing machine in the following modes - HEAT, FLOW, FLUSH, PURGE, and EMPTY |
| EMPTY: | Will empty the reservoir tank through the supply hose to an external holding tank. |
| EMERGENCY STOP: | Will stop all functions and cut power to unit. |

An initial setup of the transmission cooler flushing machine 10 will now be described in a preferred embodiment of the invention. The setup of the transmission cooler flushing machine 10 includes plugging the unit into a correctly grounded 110V AC power outlet. An air supply unit 76 is hooked up to the transmission cooler flushing machine 10. The main power switch 30 is turned to the "ON" position. The reservoir tank 60 or the supply tank is filled with automatic transmission fluid such as ATF+4 type MS9602 or equivalent through the fill port 22. The information display window 20 may be viewed by the user to indicate the amount of ATF in the reservoir tank 60. The fill cap 24 is reinstalled and tightened.

The strainer basket is verified to be screwed on tightly and that it has a clean mesh insert. If a clean strainer basket or mesh insert is needed, the manual shut off valve 50 is moved to the closed position and a new strainer basket and/or mesh insert may be supplied and secured tightly.

The adapters to the vehicle's transmission cooler supply 46 are connected to the supply line 38 and the return line 40 of the transmission cooler flushing machine 10. The OUT line on the transmission cooler is connected to the supply line 38 of the transmission cooler flushing machine 10. The IN line on the transmission cooler is connected to the return line 40 of the transmission cooler flushing machine 10. The transmission cooler flushing machine 10 is now ready to start a flushing process.

A flushing process will now be described in a preferred embodiment of the invention. To begin the flushing process, an operator presses the HEAT key to start heating the ATF. The indicator light on the top of the unit will blink until the ATF reaches operating temperature. The light will stay on once the ATF is at approximately 190° F. (While it is preferable to heat the ATF prior to flushing, the FLUSH key may be pressed before heating the ATF to cycle the ATF through the cooler. In this case the ATF will heat while it is flushing.) The operator may push the FLUSH key to enter the flush mode into the transmission cooler flushing machine 10. (The default cycle time is 10 minutes, however, the UP or DOWN arrow keys may be pressed to increase or decrease the cycle time.) The FLUSH key may be pressed before actually heating the liquid to cycle the ATF through the cooler. In this case, the ATF will heat while it is flushing. To start the flush cycle, an operator may press and hold the FLUSH key again until a message indicating that the supply line 38 and return line 40 hoses are being filled disappears from the information display window 20. The STOP key may be pressed at any time to stop the cycle. At the end of the flush cycle, the transmission cooler flushing machine 10 will purge the transmission cooler and supply line 38 and return line 40 hoses with air for approximately 10 seconds.

In another embodiment of the invention, a flow test may be performed by the transmission cooler flushing machine 10 in order to test the flow rate of ATF through the transmission cooler 46, the supply line 38, and the return line 40. A flow test process will now be described in a preferred embodiment of the invention. After performing an initial setup of the transmission cooler flushing machine 10, an operator may press and hold the FLOW key until a message indicating that the supply line 38 and return line 40 hoses are being filled disappears from the information display window 20. In one embodiment the ATF may be heated to a preferred temperature, for example, of at least 165° F. during a flow operation. Alternatively, in another embodiment, the ATF may be used at ambient temperature during the flow operation. Once the flow process has started, the information display window 20 will display the flow rate in gallons per minute (GPM). The STOP key may be pressed at any time to stop the flow test. The transmission cooler flushing machine 10 may purge the supply line 38 and return line 40 hoses by pressing and holding the PURGE key or addition unit functions may be performed.

A process to empty the reservoir tank 60 will now be described in a preferred embodiment of the invention. A large enough waste tank should be obtained in order to hold ATF fluid to be emptied from the transmission cooler flushing machine 10. The supply line hose 38 should be directed into the waste tank. Pressing the EMPTY key for approximately three seconds will start the process. The information display window 20 will indicate that the transmission cooler flushing machine 10 is emptying during the emptying process. The air pump 66 will run for approximately 20 seconds once the ATF fluid level is below approximately ½ gallon to ensure the reservoir tank 60 is emptied. The emptying cycle will stop automatically.

Thus, based upon the displayed measurements, an operator can determine whether the fluid flow rate through the transmission cooler 46 is too low and/or unacceptable. The operator may further decide to perform a flushing operation in an attempt to increase the fluid flow rate to an acceptable level. The flushing process is useful for clearing blockages within the cooling system caused, for instance, by debris.

Trapped debris within the cooling system is one cause of diminished flow rates. Such debris will ultimately cause fluid flow backup within the transmission cooler 46, in-effect, generating the reduced fluid flow rate. Left unremoved a probability exists that the transmission cooler 46 will cause a reassembled transmission system to overheat as a result of fluid flow back-up and, hence, improper cooling of the transmission system. In this instance, a flushing operation may be performed in order to clear any blockages to allow an acceptable fluid flow rate level through the transmission cooler 46.

Alternatively, a fluid flow test performed by the current invention could indicate to an operator that the fluid flow rate is acceptable. In this case, an operator can be more confident in performing additional procedures on the cooling system such as a fluid exchange since the fluid flow test would adequately confirm proper flow rates through the transmission cooler 46. Thus, any need to perform a fluid flow check on a transmission cooler 46 would never be performed in vain to an otherwise informed operator.

Hence, the transmission cooler flushing machine 10 can provide accurate information to an operator in order to make an educated assessment of the performance and integrity of fluid flow through a transmission cooler 46. Based upon this information, the operator can not only make a knowledgeable decision as to whether to employ subsequent operations, but also decide what kind of operations to perform on the transmission cooler 46 itself.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. An apparatus for testing fluid flow and flushing a transmission cooler comprising:
   a user interface panel for inputting information;
   a fluid supply line and a fluid return line;
   a pressure switch, a manual shut off valve, a filtering system, and a flow switch coupled to the return line;
   a reservoir tank for containing automatic transmission fluid and is in fluid communication with the fluid return line;
   a float type liquid level for detecting the amount of automatic transmission fluid in the reservoir tank;
   a heating element located within the reservoir tank;
   a fluid fill port connected to the reservoir tank;

an air operated fluid pump coupled to the reservoir tank; and an air injection system coupled to the fluid pump and the supply line.

2. The apparatus of claim 1, further comprising:
a flow meter coupled with the fluid pump.

3. The apparatus of claim 1, wherein the filtering system comprises:
a primary filter; and
a secondary filter.

4. The apparatus of claim 3, wherein the primary filter comprises:
a strainer basket with a mesh insert.

5. The apparatus of claim 4, wherein the strainer basket is clear.

6. The apparatus of claim 3 wherein the secondary filter filters smaller particles than the primary filter.

7. The apparatus of claim 3, wherein the secondary filter comprises:
an automotive oil filter type.

8. The apparatus of claim 1, wherein the air injection system comprises:
an air regulator for receiving air from an air supply unit;
a solenoid valve coupled to the air regulator and the air operated fluid pump; and
an air inject valve coupled to the air regulator, a flow meter, and the supply line.

9. The apparatus of claim 1, further comprising:
a reservoir lid connected to the reservoir tank.

10. The apparatus of claim 1, further comprising:
a temperature sensor for detecting the temperature of the automatic transmission fluid.

11. The apparatus of claim 1, wherein the user interface panel further comprises:
a keypad;
an emergency stop button;
a fluid fill port; and
an on/off switch.

12. The apparatus of claim 1, wherein the fluid fill port is part of the user interface panel.

13. The apparatus of claim 11, wherein the keypad further comprises:
a plurality of keypad buttons having respective functions to program the apparatus; and
a user display screen.

14. The apparatus of claim 13, wherein the functions of the keypad buttons comprises:
a heat feature to heat automatic transmission fluid within the fluid reservoir;
a flow feature to test the flow rate of the automatic transmission fluid through the transmission cooler, the supply line and the return line;
a flush feature to activate pressurized pulse of air within a flow stream of automatic transmission fluid and flush contaminated oil and debris from the transmission cooler;
a purge feature that uses air to purge automatic transmission fluid from the transmission cooler, the supply line and the return line;
a stop feature; and
an empty feature to empty the reservoir tank through the supply line.

15. The apparatus of claim 13, wherein the functions of the keypad further comprises:
an UP arrow to make incremental adjustments; and
a DOWN arrow to make incremental adjustments.

16. The apparatus of claim 14, wherein the stop feature comprises:
stopping the apparatus in any one of the heat, flow, flush, purge or empty modes.

17. The apparatus of claim 1, wherein the pressure switch automatically shuts down the apparatus if it detects a pressure above a prescribed setting.

18. The apparatus of claim 1, wherein the apparatus automatically shuts down when the manual shut off valve is in a closed position.

19. The apparatus of claim 1, wherein the air being injected into the air operated fluid pump causes turbulence in the automatic transmission fluid.

20. A system for testing fluid flow and/or flushing a transmission cooler comprising:
means for supplying automatic transmission fluid to cycle through the transmission cooler;
means for heating located within the supply means of automatic transmission fluid;
means for progressing the automatic transmission fluid through a fluid supply line connected to an OUT line of the transmission cooler;
means for re-circulating the automatic transmission fluid from an IN line of the transmission cooler into a connected fluid return line;
means for filtering the re-circulated automatic transmission fluid; and
means for returning the filtered automatic transmission fluid back into the means for supplying automatic transmission fluid, wherein the means for filtering includes a primary filter and a secondary filter, the primary filter having a strainer basket and mesh insert.

21. The system of claim 20, further comprising:
means for injecting pulses of air into the automatic transmission fluid as it circulates through the transmission cooler.

22. The system of claim 20, wherein the means for progressing comprises:
an air pump.

23. The system of claim 21 wherein the injecting means comprises:
an air inject valve.

24. The system of claim 20, wherein the strainer basket is clear.

25. The system of claim 20, wherein the secondary filter filters smaller particles then the primary filter.

26. The system of claim 20, wherein the secondary filter comprises:
an automotive oil filter type.

27. An apparatus for testing fluid flow and flushing a transmission cooler comprising:
a user interface panel for inputting information;
a fluid supply line and a fluid return line;
a pressure switch, a manual shut off valve, a filtering system, and a flow switch coupled to the return line;
a reservoir tank for containing automatic transmission fluid and is in fluid communication with the fluid return line;
a heating element located within the reservoir tank;
a fluid fill port connected to the reservoir tank;
an air operated fluid pump coupled to the reservoir tank; and
an air injection system coupled to the fluid pump and the supply line, wherein the heating element heats up the automatic transmission fluid to help dislodge contaminants.

28. An apparatus for testing fluid flow and flushing a transmission cooler comprising:
- a user interface panel for inputting information;
- a fluid supply line and a fluid return line;
- a pressure switch, a manual shut off valve, a filtering system, and a flow switch coupled to the return line;
- a reservoir tank for containing automatic transmission fluid and is in fluid communication with the fluid return line;
- a float type liquid level for detecting the amount of automatic transmission fluid in the reservoir tank;
- a heating element located within the reservoir tank;
- a fluid fill port connected to the reservoir tank;
- an air operated fluid pump coupled to the reservoir tank; and
- an air injection system coupled to the fluid pump and the supply line, wherein the flow switch automatically shuts down the apparatus if a minimum fluid flow rate is not detected through the fluid return line.

* * * * *